Patented Nov. 25, 1947

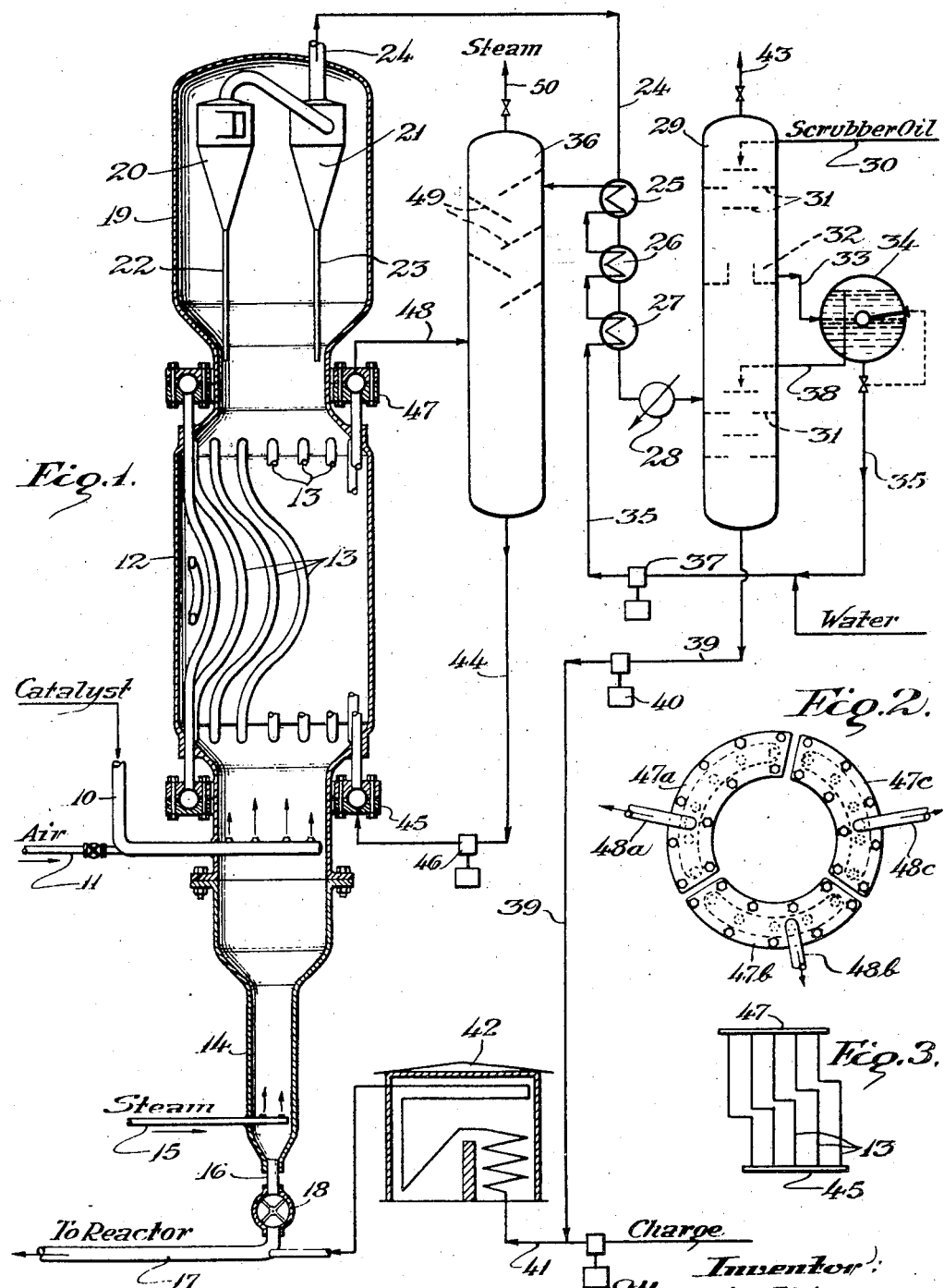

2,431,630

UNITED STATES PATENT OFFICE 2,431,630

METHOD AND APPARATUS FOR REGENERATION OF CATALYST

Maurice H. Arveson, Flossmoor, Ill., assignor to Standard Oil Company, Chicago, Ill., a corporation of Indiana Application October 30, 1941, Serial No. 417,185

5 Claims. (Cl. 252—242)

1

This invention relates to a regeneration system for finely divided or powdered catalyst which is used in a cycle of conversion or contacting and regeneration. The invention pertains to a system wherein the catalyst or contact material is regenerated by the modification or removal of carbonaceous material which has deposited thereon. This is normally accomplished by oxidation.

More particularly, the invention relates to a contacting or catalytic conversion process wherein a powdered or granular material is suspended in gases or vapors within a contacting or reaction zone, is separated from the gases or vapors, is suspended in a regeneration gas, is separated from the regeneration gas and is returned to the contacting or reaction zone. It pertains specifically to an improved method and means for regenerating spent catalyst from a powdered or fluid-type catalytic hydrocarbon system under closely controlled temperature conditions.

An object of my invention is to provide a simple and relatively inexpensive system for continuously regenerating powdered contact material in which the regeneration temperature can be closely controlled. A further object of my invention is to recover traces of catalyst from the regeneration gases. Another object of my invention is to provide an improved method and means for recovering the water of combustion from the flue gases and utilizing this water in the temperature control of the regeneration zone.

A further object of the invention is to provide an improved continuous regeneration system. Another object is to provide improved methods and means for dissipating the heat generated by the oxidation of carbonaceous materials deposited upon a powdered contact material.

According to my invention water boiler tubes are placed around the periphery but inside the regenerator whereby heat is extracted by the boiling water, water being introduced into the lower header, steam being removed from the upper header, water and steam being separated in a separator drum and water (condensate) introduced into the separator drum preferably above baffles up through which the steam flows.

Therefore another object of my invention is to provide a novel arrangement of water boiler tubes whereby expansion difficulties are minimized. A further object is to preheat the water in the steam separator prior to introduction of the water into the boiler header. These and other objects will become apparent as the description of my invention proceeds.

The invention will be more clearly understood from the following description taken with the accompanying drawings which form a part of the specification and wherein:

Figure 1 is a vertical diagrammatic elevation of a regeneration system including a schematic flow diagram and showing one arrangement of the boiler tubes;

Figure 2 is a top view of one of the headers somewhat in detail; and

Figure 3 illustrates another arrangement of the boiler tubes.

In a reaction zone (not shown) the catalyst is maintained, for example, in a fluid turbulent phase described herein. My invention, however, is not limited to catalyst from that type of reactor. The oil is cracked to gasoline and gas; and a coke or hydrocarbonaceous deposit accumulates on the catalyst particles. The reaction vapors and catalyst are separated and the substantially catalyst-free vapors are fractionated by conventional means. The spent catalyst is withdrawn from the reactor and oil vapors are removed from the spent catalyst. The stripping can be effected by flowing the catalyst downwardly against an upwardly flowing blanket of steam. The stripped catalyst is discharged by line 10 into a flowing stream of air or other oxygen-containing gas in line 11. The catalyst and gas are introduced into the regeneration zone 12 above the stripping zone described hereinafter. If desired, the air can be introduced into the regeneration zone independent of the catalyst introduction whereby the spent catalyst remains in a dense aerated phase during the transfer from reactor to regenerator.

The density of the solid particles per se may be as high as 160 pounds per cubic foot, but the bulk density of the catalyst or other contacting material which has settled from a dense turbulent suspended phase, without aeration, for five or ten minutes usually will be between about 35 and 60 pounds per cubic foot. With slight aeration, i. e., with gas velocities vertically upward of between about 0.05 and about 0.5 foot per second, the bulk density of 1 to 135 micron catalyst will be between about 20 and about 30 pounds per cubic foot. With vertical gas velocities of between about 1 and about 3 feet per second, the catalyst is in the fluid dense turbulent suspended catalyst phase and the bulk density of such catalyst may be between about 10 and about 20 pounds, for example about 15 to 18 pounds per cubic foot. With higher gas velocities, i. e., the gas velocities existing in transfer lines, the catalyst is in dilute dispersed phase, the density of which may be only about 1 or 2 pounds per cubic foot, or even less. Similarly, the light dispersed catalyst phase in the top of the regenerator can have a density of between about 50 or 100 grains and about 3 pounds per cubic foot. The light dispersed catalyst phase is at least 5, and preferably is at least 12 pounds per cubic foot lighter than the dense turbulent suspended catalyst phase.

The powdered or fluid-type catalytic hydrocarbon contacting system described above can employ a wide variety of catalysts or contacting materials, charging stocks, etc. for effecting alkylation, aromatization, cracking, decolorization, dehydrogenation, desulfurization, gas reversion, hydrocarbon synthesis, hydroforming, hydrogenation, isoforming, isomerization, polymerization, reforming, etc. It is particularly applicable, however, to the catalytic cracking of hydrocarbon oils and hydroforming of naphtha for the production of high antiknock motor fuels and aviation gasolines.

The regenerator is operated under low velocity conditions under which the dense turbulent phase is formed in a lower portion of the regenerator. The quantity of catalyst maintained in the regenerator bears a relation to the velocity of the oxygen-containing gases and will vary dependent upon the amount of regeneration desired. The operating pressure ordinarily is within the range of about 8 pounds per square inch and about 20 pounds per square inch in the case of cracking but in such processes as hydroforming the pressure will usually be higher, for example 50 to 450 pounds per square inch. A temperature of between about 900° F. and about 1050° F., for example 1000° F., is maintained.

The gas velocity to be maintained within the regenerator is related to the particle size and density of the catalyst. When the catalyst is commercial acid-treated clay having a range of mixed particle sizes between about 1 and about 135 microns, I prefer to employ gas velocities whereby the catalyst density in the contacting zone is of the order of 5 pounds per cubic foot or more, e. g., 15 pounds per cubic foot. Gas velocities of the order of between about 0.5 foot and about 4.0 feet per second, for example 1.5 feet per second, can be used.

More heat is liberated in the regenerator 12 than safely can be stored in the catalyst without exceeding the upper desired temperature limits of between about 1000° F. and about 1050° F. or higher, for example 1300° F., with certain catalysts. Therefore, it is necessary to provide means for removing heat from the regenerator 12. The manner diagrammatically illustrated is that of installing boiler tubes 13 around the periphery but inside the regenerator as described hereinafter.

Below the entrance point for air into regenerator 12 is a stripping zone 14 in which regenerated catalyst flows downwardly against an upwardly flowing blanket of process steam introduced by line 15 and which steam serves to strip the catalyst of oxygen. The regenerated catalyst is removed by line or conduit 16, introduced into transfer line 17 by valve 18 and passed to a reactor with the vapors.

The regenerator 12 can have an enlarged top section 19 to facilitate the settling of catalyst particles out of the upper dilute catalyst phase. Cyclone separators 20 and 21 knock back additional catalyst not settled out from the regeneration gases and the recovered catalyst passes by dip legs 22 and 23 into the dense turbulent phase. If desired, the dip legs 22 and 23 can be provided with suitable valves and aeration means (not shown).

The hot regeneration gases, removed overhead by line 24, may be at a temperature within the range from about 1000° F. to about 1050° F. and they may contain recoverable amounts of catalyst.

In the embodiment illustrated in the drawings, these hot regeneration gases are passed through heat exchangers 25, 26 and 27. Cooler 28 extracts additional heat from the gaseous stream. The gases are thereby cooled to a temperature not higher than about 700° F. Preferably the gases are cooled to a temperature within the range of about 500° F. to about 600° F., at which temperature the gases together with the catalyst particles suspended therein are introduced by line 24 into the scrubber 29 near its base.

A scrubber oil is introduced through line 30 at a point near the top of the scrubbing tower 29. If a plurality of scrubber oils are available the stock with the lowest vapor pressure should be charged through line 30 into the scrubber. The heavy charge to the reactor is a suitable scrubbing oil. This scrubbing tower is provided with suitable baffles 31 or, preferably, it is provided with conventional bubble plates. The scrubber oil is introduced at a temperature of about 100° F. through line 30 and the regeneration gases enter the scrubber through line 24 at a temperature of about 600° F. The scrubber is operated at about 400° F. near the bottom and at about 100° F. or less if possible near the top. Since the regeneration gases contain considerable amounts of steam, there will be a condensation of this steam at some intermediate point within the scrubber 29, the point at which the temperature corresponds to the dew point of the steam in the regeneration gases. At this point I provide a liquid trapout plate 32 and I withdraw liquids from this plate through line 33 to enlarged settling drum 34. The condensed water is drawn off at the base of this drum 34 through line 35 and cycled with make-up condensate to steam separator 36 by line 35, pump 37 and heat exchangers 27, 26 and 25.

Oil is withdrawn from the top of the settling drum 34 through line 38 and reintroduced into the scrubber tower 29. The bottoms from scrubber 29 comprising scrubber oil and the recovered catalyst is passed via line 39 and pump 40 into line 41 carrying the balance of the charge and thence into furnace 42 where the feed is vaporized in the presence of the catalyst and introduced into transfer line 17.

The cold regeneration gas leaves at the top of the scrubber 29 through vent line 43. This gas has been denuded of catalyst and the heat of the regeneration gas has been utilized to preheat the cycled stock. The amount of hydrocarbon vapors which is lost from the system with the cold regeneration gas is negligible compared to the savings in catalyst cost and efficient treatment of the cycled stocks.

Boiler tubes 13 are placed around the periphery but inside the regenerator 12. Water, which suitably is condensate from the water of combustion, is introduced by line 44 and pump 46 into the lower header 45 and heat is extracted by the boiling water. Process steam is removed from the upper header 47 and passed by line 48 into steam separator 36. Water from line 35 likewise is introduced into steam separator 36 preferably above baffles 49 up through which the steam flows. By contacting the feed water with the steam, part of the steam is recovered as condensate and the water is preheated, thereby avoiding any cold water lag in the boiler tubes 13 or header 45. Process steam is removed from the steam separator by valved line 50.

In order to minimize expansion and contraction difficulties, the tubes 13 can be of such configuration (reverse bends) as to allow for movement within the reactor. Various embodiments are shown in Figures 1 and 3. The headers can be split as shown in Figure 2.

Although an example of cooling with liquid water has been given, oil, steam, diphenyl, polymer from the hydroforming of naphtha, etc. likewise can be used as a heat extraction medium.

While I have described my process and apparatus in terms of illustrative embodiments thereof, it should be understood that I do not intend to be limited except by the following claims.

I claim:

1. In the process of regenerating a fluidized heat resistant solid catalytic contacting material by burning hydrocarbonaceous deposits therefrom and by stripping residual regeneration products from the contacting material by means of steam, the steps comprising introducing the steam employed in the stripping operation into the regeneration zone, cooling the gaseous effluent from the regeneration zone to produce a condensate including both the stripping steam and water of combustion resulting from said burning, bringing at least a portion of the condensate in indirect heat exchange with the contacting material undergoing regeneration whereby heat is extracted from the regeneration zone in producing water vapor, and contacting the resultant water vapor and said condensate to preheat the condensate.

2. In the process of regenerating finely divided catalyst by the oxidation of hydrocarbonaceous deposits thereon to produce gaseous products of combustion including water vapor and separately withdrawing the regenerated catalyst and the regeneration gases from the regeneration zone, the steps which comprise stripping regeneration gases from the regenerated catalyst with steam while maintaining the regenerated catalyst in a dense turbulent suspended catalyst phase, introducing the stripping steam and the stripped regeneration products into the regeneration zone, withdrawing and cooling the gaseous regeneration products from said regeneration zone, recovering a condensate including the stripping steam and water of combustion, directly contacting the condensate with steam whereby the condensate is preheated, flowing the preheated condensate in indirect heat exchange with the catalyst undergoing regeneration to control the temperature thereof, extracting heat from the regeneration zone in the production of additional steam, and supplying at least a part of the produced steam to said contacting step.

3. An apparatus for regenerating finely divided solid catalyst which includes a vertically elongated vessel, conduit means for introducing a gas into said vessel at a low point therein, a catalyst withdrawing conduit of smaller cross-sectional area than said vessel extending downwardly from said vessel, outlet means for withdrawing gases from a high portion of said vessel, a conduit connecting said outlet means to a condenser, a conduit extending from said condenser to a high point in a contacting chamber, heat exchange means within said vessel, a conduit extending from a low point in said contacting chamber to a low point in said heat exchange means, a conduit extending from a high point in said heat exchange means to an intermediate point in said contacting chamber, and a vent means in the upper part of said contacting chamber.

4. An apparatus for regenerating finely divided solid catalyst which includes a vertically elongated vessel, conduit means for introducing a gas into said vessel at a low point therein, a catalyst withdrawing conduit of smaller cross-sectional area than said vessel extending downwardly from said vessel, outlet means for withdrawing gases from a high portion of said vessel, a conduit connecting said outlet means to a condenser, a conduit extending from said condenser to a high point in a contacting chamber, heat exchange means within said vessel, including an upper annular header near the top of said vessel, a lower annular header near the bottom of said vessel, and a plurality of tubes extending between said upper and lower headers and within said vessel adjacent the wall thereof, a conduit extending from a low point in said contacting chamber to said lower header, a conduit extending from a high point in said heat exchange means to said contacting chamber, and a vent means in the upper part of said contacting chamber.

5. In an apparatus for regenerating finely divided solid catalyst which includes a vertically elongated vessel, conduit means for introducing a gas into said vessel at a low point therein, a catalyst withdrawing conduit extending from said vessel, and outlet means for withdrawing gases from a high portion of said vessel, the improvement which comprises a condenser, a conduit connecting said outlet means to said condenser, a contacting chamber, a conduit extending from said condenser to a high point in said contacting chamber, heat exchange means extending longitudinally through said vessel at the periphery thereof and having an upper and lower header outside said vessel, a conduit extending from a low point in said contacting chamber to a low point in said heat exchange means, a conduit extending from a high point in said heat exchange means to an intermediate point in said contacting chamber, and a vent means in the upper part of said contacting chamber.

MAURICE H. ARVESON.

REFERENCES CITED

The following references are of record in the file of this patent:

UNITED STATES PATENTS

| Number | Name | Date |
|---|---|---|
| 331,307 | Lee | Dec. 1, 1885 |
| 2,078,947 | Houdry | May 4, 1937 |
| 2,120,712 | Pyzel | June 14, 1938 |
| 2,127,009 | Pyzel | Aug. 16, 1938 |
| 2,167,698 | Vose | Aug. 1, 1939 |
| 2,196,229 | Prickett | Apr. 9, 1940 |
| 2,209,346 | McCausland | July 30, 1940 |
| 2,224,014 | Dunham | Dec. 3, 1940 |
| 2,225,402 | Liedholm | Dec. 17, 1940 |
| 2,226,578 | Payne | Dec. 31, 1940 |
| 2,273,076 | Voorhees | Feb. 17, 1942 |
| 2,304,128 | Thomas | Dec. 8, 1942 |
| 2,311,978 | Conn | Feb. 23, 1943 |
| 2,341,193 | Scheineman | Feb. 8, 1944 |
| 2,356,680 | Marancik et al. | Aug. 22, 1944 |
| 2,367,351 | Hemminger | Jan. 16, 1945 |